(12) United States Patent
Jones et al.

(10) Patent No.: US 10,275,029 B2
(45) Date of Patent: Apr. 30, 2019

(54) DIRECTIONAL AND AWARENESS GUIDANCE DEVICE

(71) Applicant: Accenture Global Solutions Limited, Dublin (IE)

(72) Inventors: John Jones, Hastings on Hudson, NY (US); Roman Kalantari, Brooklyn, NY (US); Guri Marie Venstad, Brooklyn, NY (US); Daniel Dalzotto, Brooklyn, NY (US)

(73) Assignee: Accenture Global Solutions Limited, Dublin (IE)

( * ) Notice: Subject to any disclaimer, the term of this patent is extended or adjusted under 35 U.S.C. 154(b) by 220 days.

(21) Appl. No.: 15/190,103

(22) Filed: Jun. 22, 2016

(65) Prior Publication Data

US 2016/0370863 A1   Dec. 22, 2016

Related U.S. Application Data

(60) Provisional application No. 62/183,134, filed on Jun. 22, 2015.

(51) Int. Cl.
*G06F 3/01* (2006.01)
*G06F 3/0346* (2013.01)

(52) U.S. Cl.
CPC .............. *G06F 3/016* (2013.01); *G06F 3/011* (2013.01); *G06F 3/0346* (2013.01)

(58) Field of Classification Search
CPC ........ G06F 3/016; G06F 3/0346; G06F 3/011; G06F 3/017; G06F 3/044; G09B 19/003; G09B 21/003; G09B 21/001
See application file for complete search history.

(56) References Cited

U.S. PATENT DOCUMENTS

| | | | | |
|---|---|---|---|---|
| 5,309,140 A | * | 5/1994 | Everett, Jr. ............. | B60Q 1/54 340/407.1 |
| 6,422,941 B1 | * | 7/2002 | Thorner .................. | A63F 13/02 273/148 B |
| 6,671,618 B2 | * | 12/2003 | Hoisko .................. | G01C 21/20 701/466 |
| 2002/0142701 A1 | * | 10/2002 | Rosenberg ............. | A63H 30/04 446/454 |
| 2013/0115579 A1 | * | 5/2013 | Taghavi .................. | G06F 3/016 434/113 |

(Continued)

*Primary Examiner* — Bryan Earles
(74) *Attorney, Agent, or Firm* — Fish & Richardson P.C.

(57) ABSTRACT

In one implementation, a wearable device for providing non-visual guidance to users includes one or more wireless interfaces to obtain information about the wearable device's current surroundings; one or more processors to (i) determine whether to provide non-visual guidance to a user wearing the wearable device based on the information obtained by the one or more wireless interfaces, and (ii) identify particular non-visual guidance to output to the user based on the determination of whether to provide non-visual guidance and the information; a haptic feedback array including a plurality of haptic motors arranged across at least a portion of the wearable device so that each of the plurality of haptic motors, when activated, provides haptic feedback from a distinct location of the wearable device; and a haptic engine to control the haptic feedback array to provide particular patterns of pulses that correspond to the particular non-visual guidance.

19 Claims, 10 Drawing Sheets

(56) References Cited

U.S. PATENT DOCUMENTS

| | | | | |
|---|---|---|---|---|
| 2013/0116919 A1* | 5/2013 | Furuhata | ............ | G01C 21/3629 |
| | | | | 701/408 |
| 2013/0293344 A1* | 11/2013 | Ur | ........................ | A61H 3/061 |
| | | | | 340/4.1 |
| 2014/0184384 A1* | 7/2014 | Zhu | ...................... | G09B 21/003 |
| | | | | 340/4.12 |
| 2016/0107570 A1* | 4/2016 | Modarres | ............... | B60Q 9/008 |
| | | | | 340/435 |
| 2016/0187977 A1* | 6/2016 | Cruz-Hernandez | ..... | G06F 3/016 |
| | | | | 345/156 |
| 2016/0210834 A1* | 7/2016 | Dayal | .................... | G08B 21/02 |
| 2016/0261528 A1* | 9/2016 | Blahnik | ................ | A61B 5/681 |
| 2016/0335817 A1* | 11/2016 | Hatton | ................ | G07C 5/0816 |

* cited by examiner

DIRECTIONAL AND AWARENESS GUIDANCE DEVICE

CROSS-REFERENCE TO RELATED APPLICATION

This application claims the benefit of U.S. Provisional Application No. 62/183,134, filed Jun. 22, 2015, and titled "Non-Visual Directional Guidance Device," which is incorporated by reference.

TECHNICAL FIELD

This document generally describes technology related to devices that provide directional and/or awareness information to users.

BACKGROUND

Computing devices have used displays to output visual guidance to users, such as directions and alerts. For example, mobile computing devices (e.g., smartphones, tablet computing devices) can include embedded displays that can visually output directions to a destination location from a current location of the mobile computing device.

Devices have also used various components to provide haptic feedback to users, such as vibrations that can be sensed by a user holding the devices. For example, video game controllers have included vibration motors that can be activated by the video game system to enable a player holding the controller to sense vibrations at various points during game play. In another example, mobile phones (e.g., feature phones, smartphones) have also included vibration motors that can be used to provide alerts to users, such as when the mobile phones are operating in modes with the ringer turned off.

SUMMARY

This document generally describes devices, systems, techniques, and program products to provide non-visual information to users through arrangements of haptic feedback components (e.g., haptic motors) that are positioned along various parts of a user's body. Haptic feedback components can be activated in various patterns of haptic pulses to provide such non-visual information, like navigational information (e.g., turn-by-turn directions) and awareness information (e.g., alerts regarding nearby objects, notifications regarding upcoming conditions). For example, a user can wear an arrangement of one or more arrays of haptic motors that are activated by a controller device in various patterns to convey non-visual information to the user. For instance, a threshold distance/time before a user arrives at an intersection where the user is to take a right hand turn, the controller device can activate the motors in the array that are on the right side of the user's body to inform the user that he/she should make a right turn at the intersection. Such activations can be in one or more patterns that will be recognizable to the user as navigational information, such as a pattern through which the motors are activated and deactivated a steady and consistent intervals of time (e.g., 2 seconds on, 2 seconds off), and distinguishable from other types of non-visual information, such as alerts which may be presented to a user with different patters (e.g., increased activation durations as objects get closer to a user).

In one implementation, a wearable device for providing non-visual guidance to users, the wearable device includes one or more wireless interfaces that are programmed to obtain information about the wearable device's current surroundings; one or more processors that are programmed to (i) determine whether to provide non-visual guidance to a user wearing the wearable device based, at least in part, on the information obtained by the one or more wireless interfaces, and (ii) identify particular non-visual guidance to output to the user based, at least in part, on the determination of whether to provide non-visual guidance and the information; a haptic feedback array including a plurality of haptic motors arranged across at least a portion of the wearable device so that each of the plurality of haptic motors, when activated, provides haptic feedback from a distinct location of the wearable device; and a haptic engine that is programmed to control the haptic feedback array to provide particular patterns of pulses that correspond to the particular non-visual guidance.

Certain implementations may provide one or more advantages. For example, devices can be provided to provide accurate and timely information to users through non-visual and non-auditory communication, which can provide a more reliable way for users to receive information regardless of their current environment (e.g., ambient noise level, current user activity). For instance, users can be provided with information through haptic feedback from haptic motors that are positioned at various locations along the users' bodies, which can allow for the information to be conveyed regardless of whether the user is in a noisy environment or whether the user can safely view a visual display (e.g., smartphone screen). Such devices can improve the delivery of information to users without creating additional dangers associated with users' receiving the information, such as through users needing to view a screen or wear headphones to receive information. Accordingly, such devices can improve user safety in association with information delivery.

In another example, user's with disabilities, such as visual impairments, can be provided with a "sixth sense" to allow them to receive additional information regarding their surrounding environment through non-visual haptic feedback. For instance, a user with a disability can receive haptic feedback alerting the user of nearby physical objects to help the user better navigate through their physical environment.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
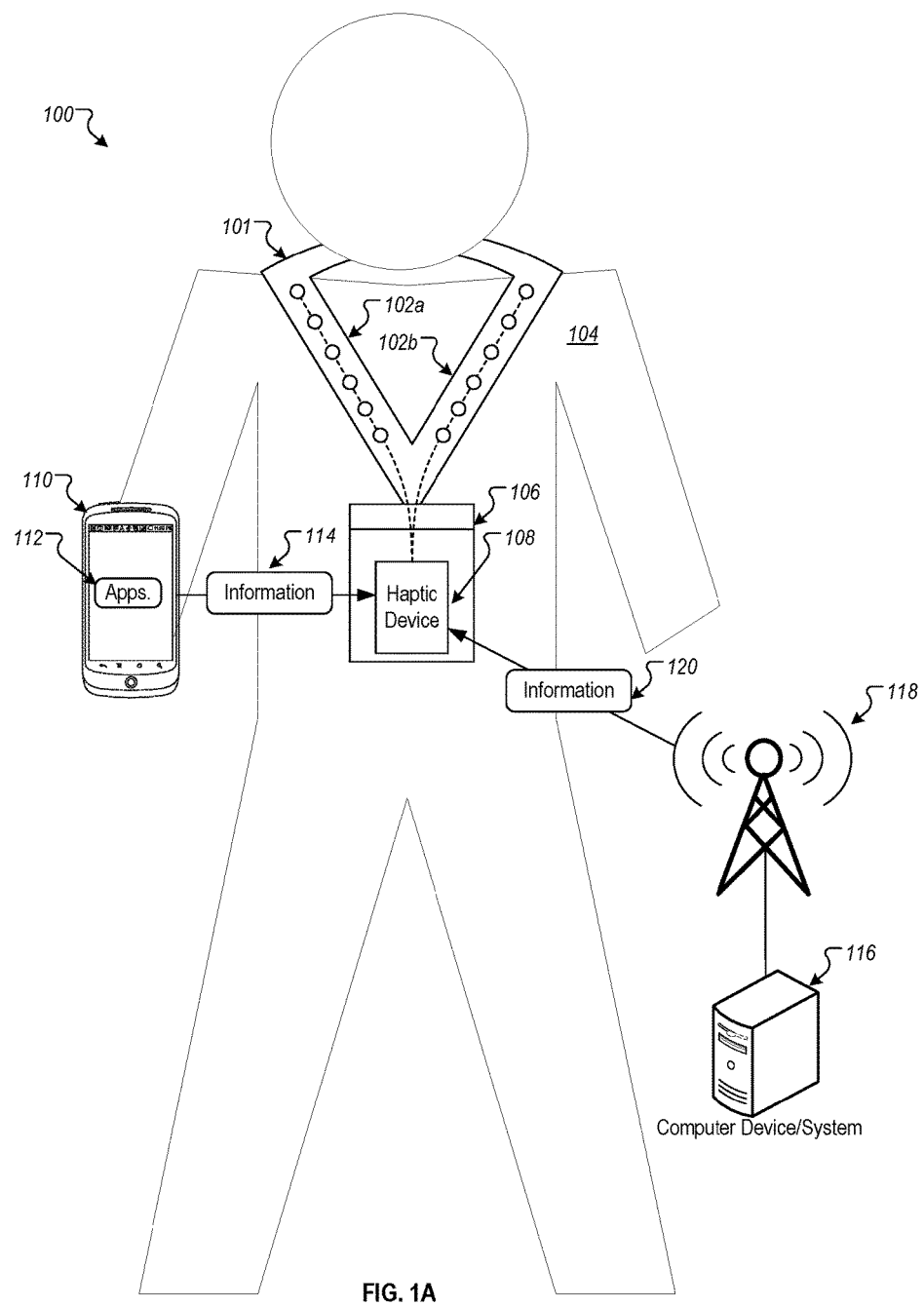
FIGS. 1A-C depict example systems through which devices provide non-visual information to users.

In some implementations, devices provide non-visual guidance and awareness information to users through patterns of haptic pulses that can be output through arrangements of haptic feedback components (e.g., haptic motors). For example, devices can include one or more horizontal arrays of haptic motors and one or more vertical arrays of haptic motors that can be activated in various patterns to provide notifications and/or guidance to users, such as notification relevant to the users' surroundings (e.g., alert regarding approaching vehicle) and/or movement (e.g., directions to destination location). For instance, a user who is travelling to a destination location along a route with an upcoming right turn can receive, from the user's device, a pattern of haptic pulses (e.g., sequential activation from left to right of horizontal array of haptic motors) at an appropriate time (e.g., when the user is 1 block away from the turn) to indicate, in a haptic (non-visual) manner, that the user should make a right turn.

In some examples, a wearable device provides non-visual guidance to users. In these examples, the wearable device includes one or more wireless interfaces that are programmed to obtain information about the wearable device's current surroundings; one or more processors that are programmed to (i) determine whether to provide non-visual guidance to a user wearing the wearable device based, at least in part, on the information obtained by the one or more wireless interfaces, and (ii) identify particular non-visual guidance to output to the user based, at least in part, on the determination of whether to provide non-visual guidance and the information; a haptic feedback array including a plurality of haptic motors arranged across at least a portion of the wearable device so that each of the plurality of haptic motors, when activated, provides haptic feedback from a distinct location of the wearable device; and a haptic engine that is programmed to control the haptic feedback array to provide particular patterns of pulses that correspond to the particular non-visual guidance.

Certain implementations may provide one or more advantages. For example, devices can provide users with more detailed information through haptic feedback, which can help improve user safety and/or decrease user dependence on displays (and/or other interfaces) that may distract users from their surroundings. For instance, users can receive notifications about potential dangers in their surroundings (e.g., approaching vehicle) and can receive guidance on how to avoid the potential dangers (e.g., pattern of pulses guiding the user away from the danger) without the users having to view or hear any information, either of which (hearing and viewing information) may not be possible (e.g., user riding a bike or driving a car, noisy environment) and/or may distract the user from what they are currently doing.

The details of one or more embodiments are set forth in the accompanying drawings and the description. Other features and advantages will be apparent from the description and drawings.

In some implementations, devices can be used to communicate information, such as information providing direction and/or general spatial awareness, to the wearer. For example, devices can include haptic motors that are, for instance, embedded in lanyards with electronics encased in lanyard pockets. Wearable devices with haptic output modules can additionally and/or alternatively be woven into fabric and/or clothing, attached to objects that are handled by users (e.g., bicycles), and/or worn by users at various locations on their bodies, such as their shoulders, back, and/or upper arms.

Devices can use haptic motors and associated electronics to provide specific sets of pulses to communicate information to users, such as the positions of surrounding objects, directions, and/or other general way finding instructions. Such devices can be used by a variety of different users and in a variety of different ways, such as by bicyclists and/or other users travelling without ready access to devices with audio/visual interfaces, way finding by people who are vision-impaired (e.g., blind users, users with partial vision loss), for obtaining information (e.g., location information, directions, alerts, notifications) without referring to mobile devices, centralized group movement coordination (e.g., coordinated movement information), and/or other appropriate uses.

Such devices can take a variety of inputs to provide appropriate haptic feedback to users, such as inputs from applications on associated mobile devices and/or inputs obtained from global positioning system (GPS) components, short-range wireless communication technology (e.g., BLUETOOTH), cellular, vehicle-to-vehicle wireless, radio frequency (RF), infrared, and/or ultrasonic communications.

Figure 1B:
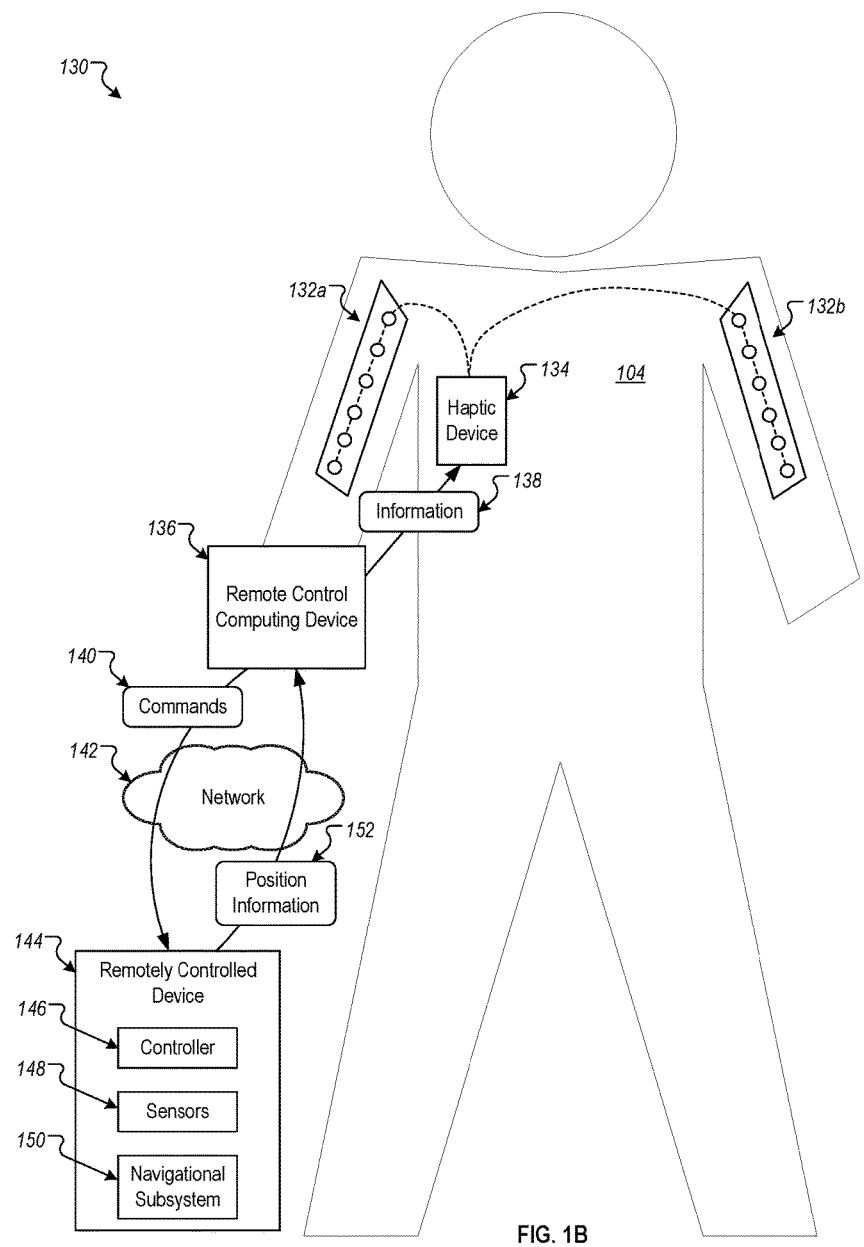
Figure 1C:
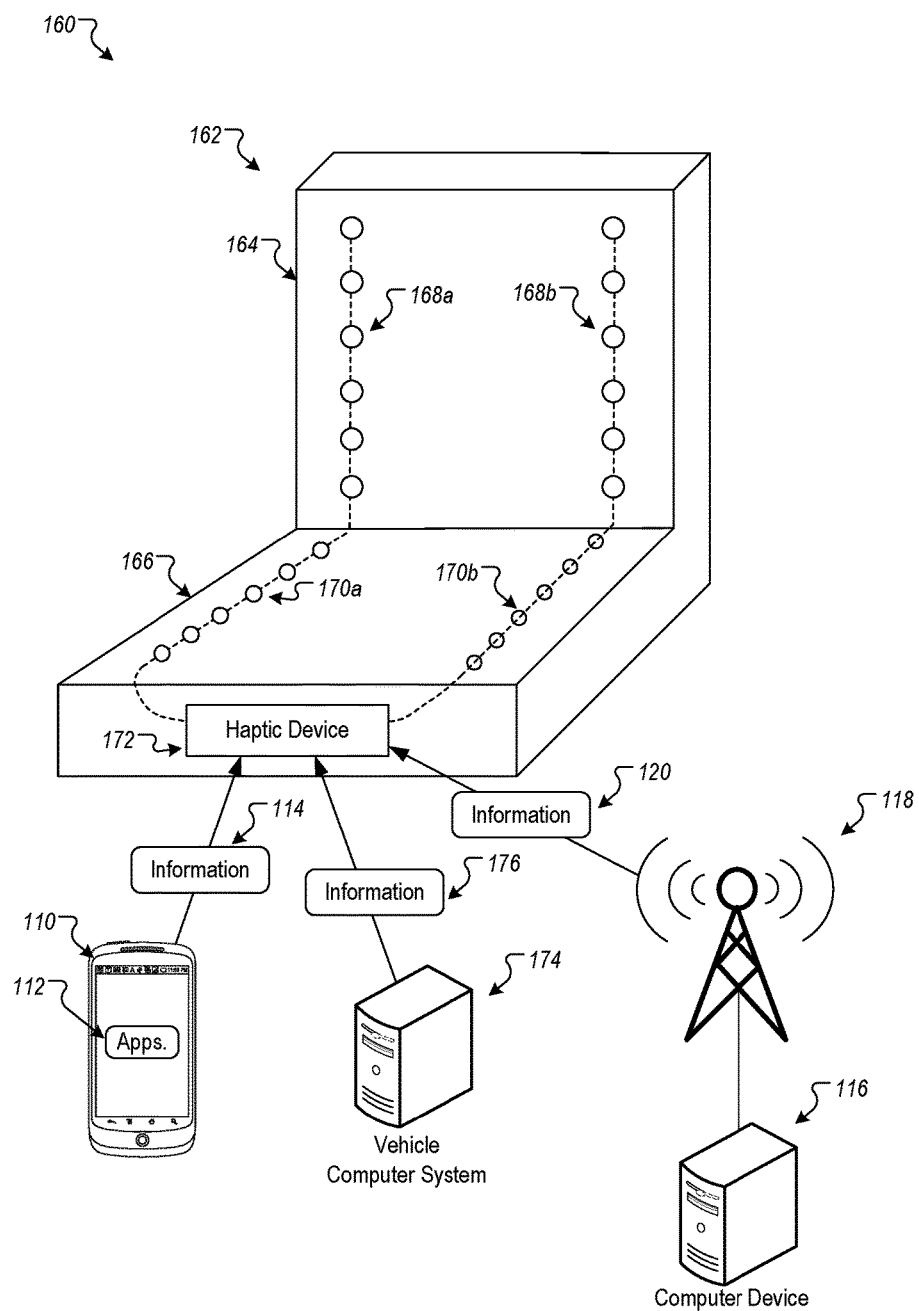

FIGS. 1A-C depict example systems through which devices provide non-visual information to users.

Referring to FIG. 1, an example system 100 with an example lanyard 101 is depicted as including an example arrangement of haptic motors in two arrays 102a-b extending along the left and right portions of the lanyard 101, respectively. The lanyard 101, which is being worn by an example user 104, includes a pocket 106 that holds an example haptic computing device 108 that is programmed to provide haptic information to the user 104 through the haptic motor arrays 102a-b. The device 108 can include a haptic engine that controls haptic motor pulses at different locations on the device lanyard 101 (e.g., right side, left side, top side, bottom side) and can combine the pulses into patterns to provide the user 104 with information, such as instructions to move/turn right conveyed through pulses moving from left to right across an arrangement of haptic motors. Different pulsing patterns (e.g., pulse intensity, pulse duration, intervals between pulses, particular ones of the haptic motors in the arrays 102a-b that are activated) can indicate different information (e.g., car approaching, action instruction forthcoming) and/or actions (e.g., turn left) for a user to take, such as move/turn left, move/turn right, speed up, slow down, go straight, and/or other appropriate actions.

For instance, the example arrangement of haptic motors 102a-b includes an array of haptic motors 102a extending along the right side of the user 104 (left side of the figure, which is depicted facing the user 104) and another array of haptic motors 102b extending along the left side of the user 104 (right side of the figure). Information can be conveyed to the user 104 by activating the haptic motors in the arrays 102a-b in various pulse patterns, such as activating all of the haptic motors in the array 102a to instruct the user to turn right, activating all of the haptic motors in the array 102b to instruct the user to turn left, sequentially activating the haptic motors in one or both of the arrays 102a-b from top to bottom (from the topmost haptic motor to bottommost haptic motor) to provide guidance to the user 104 to slow down/stop, and/or sequentially activating the haptic motors in one or both of the arrays 102*a-b* from bottom to top (from the bottommost haptic motor to topmost haptic motor) to provide guidance to the user 104 to speed up/start.

The arrays of haptic motors 102*a-b* are provided as illustrative examples. Other arrangements are also possible, such arrays of haptic motors extending along different parts of the user's body, like example arrays extending across the user's shoulders (from one of the user's shoulders to the other), arrays extending along the user's upper arms (bicep and/or shoulder area), arrays extending along the user's lower arms (forearms and/or wrist), arrays extending around the user's torso (extending around the user's waist, extending around the user's chest, extending around areas near the user's kidneys), and/or arrays arranged at other appropriate parts of the user's body. Such arrays can be woven/attached/included in clothing and/or other items (e.g., equipment, harness) that a user may wear. Haptic motors may be spaced at intervals across portions of the user's body so that pulses can be differentiated from each other. Arrangements other than arrays of haptic motors are also possible, such as groupings of haptic motors arranged in various patterns, such as grids, concentric rings, and/or other appropriate arrangements to convey haptic information to the user 104.

Patterns of pulses that are provided across the haptic motors 102*a-b* can be provided to be intuitive and to need little decoding from the user 104 to understand what they mean. For example, pulses from the haptic motors 102*b* on the left side of the user's body can instruct the user to turn/move left. The device 108 can determine when and what type of pulses to provide to the user 104 based on a variety of factors, such as a current location of the user 104/device 108, whether the user 104/device 108 is travelling/moving, a speed at which the user 104/device 108 is travelling/moving, other objects (e.g., vehicles) that are located nearby, information provided by a mobile computing device that is in short range communication (e.g., BLUETOOTH, NFC communication) with the device 108 (e.g., navigation information from a mobile navigation application), user designated settings, and/or other appropriate factors.

The lanyard 101 and device 108 can be used in a variety of different ways, such as to assist vision-impaired users in navigating and/or to provide non-visual navigation assistance to users so that users can navigate to destinations without having to directly access or look at a mobile computing device or other device with a visual user interface. For example, the device 108 can monitor the current location of the user 104 and, when appropriate, can provide haptic guidance to the user 104 as to which way to travel (e.g., left, right, forward, backward) to reach a destination location. Other uses are also possible.

The example system 100 additionally depicts example sources of information that are used by the device 108 to determine when, how, and what type of non-visual information to provide to the user 104 through the haptic motors 102*a-b*. For example, a mobile computing device 110 (e.g., smartphone, tablet, laptop, smartwatch, fitness tracker, wearable device) can run one or more applications 112 that are programmed to provide information 114 that can be used by the haptic device 108 to provide non-visual information to the user 104. For instance, the one or more applications 112 can include a navigation application running on the device 110 that provides information regarding upcoming turns to the haptic device 108, that the device 108 evaluates and translates into non-visual information through the haptic motors 102*a-b*.

In another example, the one or more applications 112 can include a crowd management application that is programmed to communicate the current location of the user 104 to a crow flow optimization computer system and to receive navigation recommendations to optimize the user's movements as part of the crowd. For example, when waiting in line (e.g., sporting event, concert, travel), a crowd management application (example of application 112) can provide the current location of the device 110 to the crowd flow optimization computer system, which can use the information to determine the current location of the user 104 within one or more groups (e.g., lines) at a venue and to determine whether any of the other groups at the venue would provide more optimal (e.g., faster, shorter, less chance of delay). If another group is identified as being more optimal for the user 104, then the crowd flow optimization computer system can provide location/navigation information for that other group to the mobile computing device 110, which can process and relay the information to the haptic device 108, which can convey the information to the user as non-visual information to guide the user 104 to the more optimal group.

In a further example, the one or more applications 112 can include a presentation management application that can, for example, manage the display of slides that are part of a presentation being provided by the user 104. The presentation management application can include pacing features to aid the user 104 in appropriately pacing through the presentation given the time allotted for the presentation. If the user is either moving too slowly or too quickly through the presentation, the presentation management application can transmit a corresponding information to the haptic device 108 to be cue the user 104 to either slow down or speed up.

The example system 100 can also include another computer device/system 116 that can broadcast information 120 through one or more antennae 118 that can be received and used by the haptic device 108. For example, the information 120 from the computer device/system 118 can be a wireless radio transmissions from vehicles, traffic control devices (e.g., stoplights), and/or other physical objects broadcasting their location/status, which can be used by the device 108 to determine nearby physical objects to provide alerts to the user 104. 132*b*

Referring to FIG. 1B, an example system 130 is depicted in which the user 104 is wearing example haptic motor arrays 132*a-b* along his/her arms, such as through arrays that are releasably attached to the user's arms (e.g., attached with releasable straps, like VELCRO) and/or are attached/affixed to clothing items (e.g., shirt, jacket) that are worn by the user 104. The haptic arrays 132*a-b* can be similar to the arrays 102*a-b* described above with regard to FIG. 1A, and they can be connected to a haptic controller device 134 that controls activation of the arrays 132*a-b*. In this example system 130, the haptic device 134 receives information 138 from a remote control computing device 136 (computing device providing control signals to another device) that is used to provide non-visual guidance information to the user 104 regarding the positioning and control of a remotely controlled device 144, such as a robot, drone, spacecraft, and/or other remotely controlled device.

The remote control computing device 136 can provide commands 140 to the remotely controlled device 144 over one or more networks 142 (e.g., internet, local area network (LAN), wide area network (WAN), mesh network, satellite-based communications network, BLUETOOTH network, or any combination thereof), which a controller 146 of the remotely controlled device 144 can receive and perform. The remotely controlled device 144 can monitor its own positioning (e.g., positioning of itself and/or its components relative to a coordinate system and/or other objects) using sensors 148 and a navigational subsystem 150. The device 144 can transmit its position information 152 to the remote control computing device over the networks 142, which can process the information 152 to determine whether the device 144 has achieved a target positioning. If the device 144 has not yet achieved the target positioning, the device 136 can determine a direction which the device 144 (or its components) need to be moved in order to achieve the target positioning and can provide information 138 that identifies that direction. The haptic control device 134 can then provide feedback to the user 104 regarding control of the device 144 in the form of activation of one or more of the arrays 132*a-b* to suggest control of the device 144 in the determined direction so that it can achieve the target position. For example, if the remotely controlled device 144 is determined to be left of its target position, the haptic device 134 can activate one of the arrays 132*a-b* to suggest either that the user control the device 144 in the direction of or away from the haptic feedback. For instance, in some implementations the haptic feedback can suggest that the user control the device 144 (using the device 136) in the direction of the haptic feedback. In other implementations, the haptic feedback can suggest that the user control the device 144 (using the device 136) away from the direction of the haptic feedback.

The system 130 can allow for the user 104 to receive spatial positioning information regarding the remotely controlled device 144 in a manner that uses less bandwidth and has less latency than visual-based positioning information. The system 130 can permit, for example, responsive control of the device 144 over higher latency networks, such as control of the device 144 performing operations in outer space or in other extreme environments (e.g., deep sea exploration).

Although the haptic arrays 132*a-b* are described as being attached to the user's arms, they can be attached to other locations on the user's body, in other quantities, and/or in other configurations. The haptic arrays 132*a-b* can, for example, be positioned in a lanyard like the arrays 102*a-b*. Similarly, the arrays 102*a-b* described above in FIG. 1A can be similar to the arrays 132*a-b* depicted in FIG. 1B.

Referring to FIG. 1C, an example system 160 is depicted in which haptic arrays 168*a-b* and 170*a-b* included in a seat 162 with a back support 164 and a seat base 166 are activated by a haptic control device 172 to provide haptic feedback to a user sitting in the seat 162. The seat 162 can be, for example, a seat in a vehicle, such as a car, truck, airplane, boat, and/or other vehicle. For example, the haptic arrays 168*a-b* and 170*a-b* can be embedded within and/or affixed to the seat back 164 and/or the seat base 166, and can be activated by the haptic control device 172 based on information from one or more sources, such as the mobile computing device 110 providing the information 114 via one or more applications 122 (as described above), a computer device/system 116 transmitting the information 120 via a wireless antennae 118, and/or a vehicle computer system 174 that can provide information 176 that is relevant to a vehicle in which the seat 162 is installed. The information 176 can identify things that are relevant to operation of the vehicle, such as warnings regarding objects (e.g., other vehicles, people, objects) that are in a blind spot, information on other vehicles that are coming up on and are overtaking the vehicle, and/or other relevant information.

The haptic device 172 can be programmed to provide haptic feedback information through the haptic arrays 168*a-b* and/or 170*a-b* similar to the haptic devices 108 and 134 described above with regard to FIGS. 1A-B, but can provide it through the seat 162 instead of through wearable haptic arrays. For example, the haptic device 172 can activate haptic arrays 168*a-b* and/or 170*a-b* in one or more patterns to provide the user, who may be actively driving a vehicle when receiving the information and may otherwise be unable to safely receive visual information, with non-visual information, such as status and/or safety information related to the vehicle's surroundings. For instance, instead of or in addition to providing blind spot notifications in a side mirror, the haptic device 172 can activate corresponding ones of the haptic arrays 168*a-b* and 170*a-b* to indicate that a vehicle is in a blind spot. In another example, the haptic device 172 can augment/supplement information that a user would obtain through looking in the vehicle's mirrors, such as information on approaching and/or nearby vehicles, like pulsing the arrays 168*a-b* and/or 170*a-b* in durations that correspond to the distance of an approaching vehicle (e.g., vehicles further away can be identified with a pulse with a short duration whereas vehicles that are closer can be identified with a pulse of a longer duration).

Figure 2:
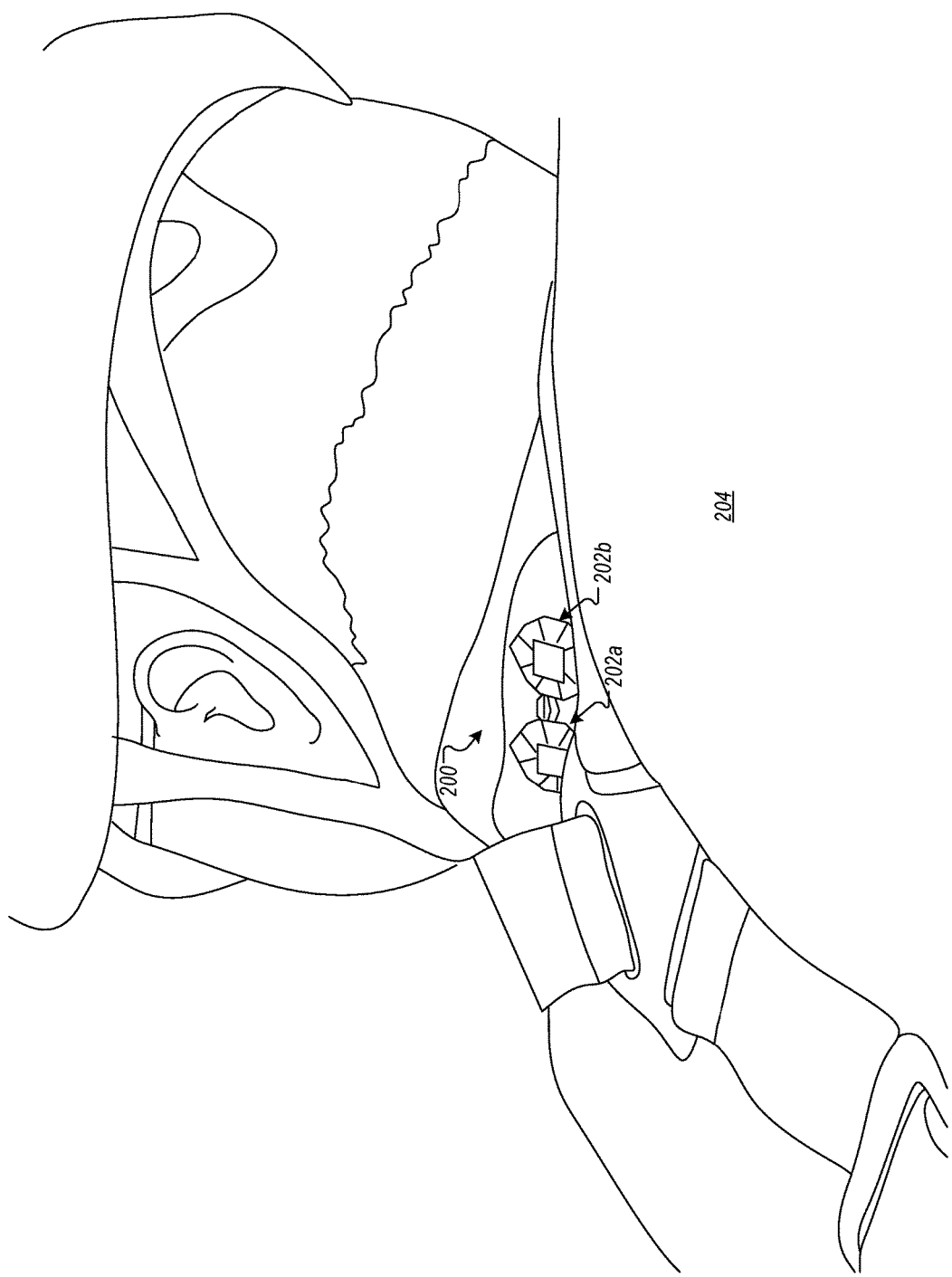
FIG. 2 depicts an example wearable device to provide non-visual information to users.

FIG. 2 depicts an example wearable device 200 to provide non-visual information to users. The example wearable device 200 is depicted as being worn on the back of a user 204. The wearable device 200 can include an arrangement of haptic motors, such as the example haptic motors 102*a-b*, which in this example are located across the user 204's back and underneath the user 204's clothing. A haptic engine that is part of the device 200 can control the delivery of pulses to the user 204 by the haptic motors, such as pulses that increase in frequency and intensity as vehicles approach on either side of the user 204, who in this example is a bicycle rider. For example, the device 200 by itself (and/or in combination with other devices, such as a mobile computing device in communication with the device 200) can determine that a car is further away on the right side of the user 204, which can cause the device 200 to emit a slow pulse using the haptic motors. As the device 200 detects that the car is approaching the user 204 (who may also be moving), the device 200 can cause the pulses provided by the haptic motors to increase in intensity and/or frequency so as to inform the user 204 of the approaching traffic. Such a device 200 can be used in a variety of ways, such as to provide traffic spatial awareness to users (e.g., bicycle riders, drivers, pilots, boat drivers, walkers/runners).

The device 200 is also depicted as including example visual indicators 202*a-b* (e.g., LEDs) that can be used to provide visual notifications about the haptic information that is being provided to the user 204. For example, the visual indicators 202*a-b* can be illuminated in conjunction with corresponding haptic motors to indicate when, where, and what type of haptic feedback is being provided to the user 204. Such visual cues can be useful in a variety of contexts, such as for researchers working with the technology. In another example, the visual indicators 202*a-b* can provide an indication to other people around the user 204 indicating changes in direction for the user 204, such as the user 204 making turns. For instance, the visual indicators 202*a-b* can be spaced further apart across the user 204's back to function as turn signals that can alert others in the area of planned changes in the user 204's direction.

Although not depicted, the device 200 can have arrangements of haptic motors and/or can provide pulse patterns similar to those described above with regard to the example wearable device 100. The device 200 also may include circuitry similar to that described above with regard to the example wearable device 100 to receive inputs from a mobile device, to sense surrounding environmental conditions, and to control the haptic motors through a haptic engine that processes the directional and awareness data available to the device 200.

Figure 3:
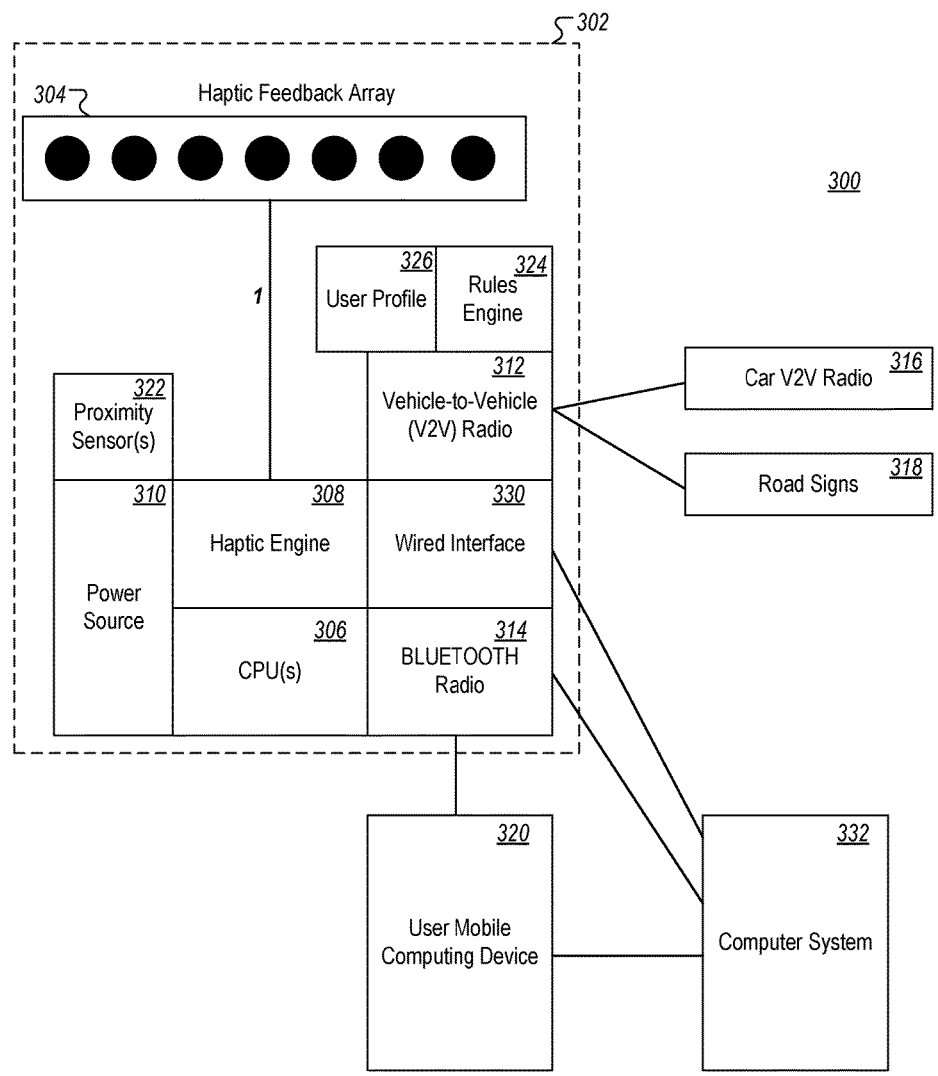
FIG. 3 depicts an example system that includes a wearable device for providing information to users through the use of one or more haptic motor arrays.

FIG. 3 depicts an example system 300 that includes a wearable device 302 for providing information to users through the use of one or more haptic motor arrays 304. The device 302 can be similar to the example systems and devices described above with regard to FIGS. 1A-C and FIG. 2. The array of haptic motors 304 can be similar to the arrays of haptic motors 102a-b, 132a-b, 168a-b, and/or 170a-b as described above with regard to FIG. 1A-C.

The device 302 includes a central processing unit (CPU) 306 that is programmed to determine when and what type of information (e.g., alerts, instructions, guidance, notifications) should be provided to users. The device 302 also includes a haptic engine 308 that is programmed to translate the information identified by the CPU 306 into patterns of haptic pulses that can readily be understood by users and to activate the haptic feedback array 304 to implement the patterns of pulses. The CPU 306 and the haptic engine 308 can convey information to users for a variety of uses, such as spatial awareness and/or navigation. The haptic engine 308 can identify natural/intuitive haptic sequences of pulses from the haptic motor array 304 to convey information determined by the CPU 306, such as haptic sequences to alert users of approaching vehicles and/or other hazards.

The device 302 can include a power source 310, such as a battery, that can power the components of the device 302, such as the haptic feedback array 304, the CPU 306, and/or the haptic engine 308. For example, the haptic engine 308 can control operation of the haptic motors within the array 304 by toggling power on/off from the power source 310 to select motors in the array 304. The haptic engine 308 can additionally control the level of power that is applied to the haptic motors in the array 304, which can result in varying levels of intensity for the haptic feedback that is sensed by users. The haptic engine 308 can also control patterns with which the power is toggled on/off and levels of power that are provided to the array 304 to provide varying haptic effects that are sensed by users. Power can be provided to the haptic array 304 by wires indicated by line #1, the operation of which can be controlled by the haptic engine 308. Each haptic motor in the haptic array 304 can have a set of wires that supply power to the individual haptic motor and that are controlled by the haptic engine 308.

The CPU 306 can determine information that should be provided to users with the haptic array 304 based on a variety of different inputs. For example, inputs regarding the surrounding environment, including objects (e.g., vehicles, other users, buildings, intersections, traffic control devices), can be obtained through the use of one or more wireless interfaces. For instance, an input regarding the proximity of nearby vehicles can be obtained by a vehicle-to-vehicle radio interface 312 that is part of the device 302 that is programmed to wirelessly receive information about nearby vehicles transmitted over vehicle-to-vehicle communication network 316. Vehicles, such as motor vehicles like cars and trucks, can be equipped to broadcast information about their current location (e.g., GPS coordinates, street) and movement (e.g., bearing, speed, acceleration/deceleration) wirelessly (e.g., over short-range radio communication) to alert other vehicles in the area as to their presence. Similarly, road signs 318 and other traffic control devices can wirelessly transmit information that can be detected by the radio interface 312, such as their location, current state (e.g., red light, green light, high traffic, low traffic), and/or other information that may be relevant to vehicles traveling within a threshold distance of their location.

In another example, the device 302 can include a BLUETOOTH radio interface 314 (e.g., BLUETOOTH low energy (LE) interface) to communicate with a user mobile computing device 320 (e.g., smartphone, tablet computing device) that can be associated with the user wearing the device 302. The user mobile device 320 can run various applications that provide information to the device 302, such as navigation applications (e.g., applications providing turn by turn directions, applications providing location information (e.g., GPS coordinates)), schedule applications (e.g., electronic calendar application), contact management applications (e.g., electronic contacts applications), applications programmed to specifically interface with the device 302 (e.g., mobile applications obtaining sensor information from sensors on the mobile device 320, like gyroscopes, accelerometers, GPS modules, altimeters; mobile applications obtaining information from other applications running on the mobile device 320), and/or other appropriate applications. In some instances, the user mobile device 320 can provide information regarding the device 302, such as user behavior in response to information conveyed over the haptic array 304, back to a remote system (e.g., cloud system, road network system) that can be incorporated into, for example, traffic information.

The CPU 306 can also use input from one or more proximity sensors 322 that are part of the device 302 to determine when and what type of information to provide to a user of the device 302. The proximity sensors 322 can be any of a variety of appropriate proximity sensors, such as ultrasonic sensors, sonar sensors, optical sensors (e.g., machine vision systems), infrared sensors, and/or other appropriate sensors to detect nearby objects, such as vehicles, buildings, structures, and/or changes in topography. For example, the proximity sensors 322 can provide information on the changing distance of a vehicle that is approaching a user wearing the device 302.

The CPU 306 can determine a variety of information to provide to a user based on various inputs, such as those described above. For example, the CPU 306 can determine spatial information about the user's surroundings, such as notifications about nearby objects. In another example, the CPU 306 can determine navigational information to provide to the user, such as instructions to make turns, speed up, slow down, and/or other appropriate notifications. The CPU 306 can determine other types of information as well (e.g., communication notifications).

The CPU 306 can provide the information to the haptic engine 308, which can determine whether, when, and how to convey the information to the user. The haptic engine 308 can be programmed to avoid overwhelming the user with notifications, which may become meaningless and difficult to understand if they are too frequent. The haptic engine 308 can use a rules engine 324 that is programmed to prioritize information to provide to a user with the haptic array 304. In some instances, information that is identified by the CPU 306 may not be provided to the user if it is not sufficiently important within a current context for the user/device 302 based on determinations by the rules engine 324 (e.g., location, proximity to nearby objects, speed of travel). For example, the CPU 306 may determine information about surrounding objects (e.g., vehicles) and at or around the same time determine that the user has an upcoming turn. If the surrounding objects are greater than a threshold distance away from the user and/or they are not on a trajectory to collide with the user, the rules engine 324 can prioritize the navigational information (upcoming turn) above the surrounding object information, and may only provide haptic information about the navigations information using the array 304.

For example, a user riding a bike may receive a slow and steady pulse regarding a nearby car. However, when an upcoming turn is determined by the CPU 306, the haptic engine 308 can switch to providing stronger haptic notifications regarding the turn to the user. For instance, the haptic engine 308 can provide a first stronger pulse to notify the user that an instruction for the user to perform an action is upcoming (users may need to be prompted with a first haptic message to anticipate a particular action instruction) and then may be provided with the particular haptic action instruction (e.g., 3 quick and strong pulses on portions of the haptic array 304 on the right side of the user's body to instruct the user to turn right). After providing the action instructions, the haptic engine 308 can go back to providing the spatial information pulses about nearby objects. The haptic engine 308 can be programmed to prioritize haptic action instructions over haptic spatial information. In this manner, the haptic spatial information may be provided as general baseline or steady state information throughout use of the device 302 and the haptic action instructions may be provided as interrupts of the general baseline information to garner user attention to the actions needed. After actions are completed, the device 302 may return to providing the haptic spatial information as general baseline information.

The rules engine 324 can include various rules for prioritizing haptic information to provide to the user. The rules can be generated and/or refined based on a variety of sources, such as user input (e.g., user defined rules/settings) and/or other computing devices (e.g., the mobile device 320, a remote computer system).

The haptic engine 308 can translate the information from the CPU 306 into a haptic language that may be different from the information itself. For instance, the haptic engine 308 can provide information using a variety of haptic variables, such as intensity of the haptic feedback (e.g., intensity of the vibrations), durations of the haptic feedback (e.g., length of time the vibrations are being continuously provided), intervals between haptic feedback (e.g., length of time between vibrations), and/or particular sequences of portions of the haptic array 304 that are activated. The haptic engine 308 can determine these haptic variables when providing haptic information using the array 304 based on a variety of factors, such as the current speed with which the device 302 is travelling, a current wind speed, current levels of vibrations in the users body (e.g., stationary with low vibrations, travelling on bus with high levels of ambient vibrations), locations of the haptic motors in the array 304 on a user's body, and/or other appropriate factors. For example, a user travelling at a high rate of speed may only detect strong pulses of the array 304, whereas a user who is moving slowly may be able to detect weaker pulses. In another example, pulses may be more readily detected at particular locations on a user's body (e.g., upper arms) than other locations (e.g., legs).

Translation of information determined by the CPU 306 to a haptic language used by the haptic engine 308 can include using patterns of pulses and/or sequences of pulses that can be intuitively understood by a user. For example, the haptic engine 302 can increase the intensity and duration of pulses (while leaving the interval between pulses the same) as a car approaches the user. In another example, the haptic engine 302 can provide various patterns of short and longer pulses to convey particular types of information, such as proximity (shorter may indicate further away, longer can indicate closer).

The haptic engine 308 can determine timing for haptic information that is different from the timing for visually and/or audibly conveyed information. For example, a user may need to be provided with haptic action information further in advance than when the user would be normally provide with visual and/or audio cues. Accordingly, the haptic engine 308 can provide action instructions further in advance of when those instructions may be provided in a traditional visual or audio interface. The haptic engine 308 can take into account pacing information for the user, such as a current speed at which the user is travelling and/or determining when to provide particular types of haptic information, such as navigational information. Additionally, the haptic engine 308 may provide one or more particular types of haptic feedback to indicate to the user that haptic instructions will be forthcoming, so that the user is paying attention to the haptic instructions.

As indicated above, the haptic engine 308 may not simply translate information from the CPU 306 into to haptic output, but may instead augment the information. For example, the haptic engine 308 may change the timing by which haptic instructions are provided to the user (e.g., providing them at an earlier time, providing them at a later time) based, for example, on a speed at which the user is travelling, a distance from the user's current location to a point where instructed action is to be performed (e.g., corner where the user is instructed to turn), and/or a time for the user to reach the point to perform the instructed action.

As described above, the mobile computing device 320 can include an application (e.g., a mobile app) that is programmed to collect information available on the mobile device, such as location information (e.g., GPS coordinates), sensor information (e.g., altimeter data), information from other applications that are running on the mobile device 320 (e.g., navigational apps), user information (e.g., behavioral information for the user, health/fitness information for the user), communication information (e.g., text messages, email messages, contacts), social network information (e.g., social network connections, location information for friends), electronic calendar information (e.g., upcoming schedule for the user), and/or other appropriate information. This and other information may be accessed by such an application running on the mobile computing device 320 based on user permission or consent to access such information. Such an application can collect and provide this information from the mobile computing device 320 to the device 302, which the CPU 306, the haptic engine 308, and/or the rules engine 324 can use alone or in combination with other inputs (described above) to provide haptic output to using the array 304.

For example, the CPU 306, the haptic engine 308, and/or the rules engine 324 can combine the information received from the mobile device 320 with information detected by the proximity sensors 322 and/or received via the wireless interface 312 to determine whether, what type, and when to provide haptic output using the array 304. For example, the mobile device 320 can provide the device 302 with a current GPS location for the device 320, a current velocity and bearing at which the device 320 is travelling, and information indicating that a next turn in the user's route to a destination is coming up in one city block. The device 302 can also obtain information about nearby cars along the road using the proximity sensors 322 and the vehicle-to-vehicle interface 312. The device 302 can use this information to determine that there are cars behind the user of the device 302 and that an action instruction should be provided to the user for the upcoming turn. The rules engine 324 can use this information to determine that the action instruction for the upcoming turn should be provided to the user, and can cause the array 304 to provide the instruction to the user.

In another example, the device 302 can obtain calendar information from the mobile device 320 indicating that the user is taking a trip on a train. The device 302 can also obtain location, speed, and navigation information from the mobile device 320 indicating that, if the user does not increase his/her speed, she/he will miss the train. The CPU 306 can determine that the user should speed up and can provide the indication to the haptic engine 308, which can provide an action instruction to the user with the haptic array 304. For instance, the haptic engine 308 can cause the haptic array 304 to provide a sequence of pulses moving up the user's body (e.g., pulses sequencing from the user's torso to the user's neck). The device 302 can continue to monitor and provide, at various intervals, such notifications until the user has sufficiently sped up so that he/she will make the train.

The device 302 can additionally differentiate between surrounding objects (e.g., through machine vision analysis of moving vs stationary objects through assessment of relative speed and/or a combination of proximity and vehicle communications to distinguish vehicular and non-vehicular objects) and providing different output for different objects. For example, the CPU 306 can differentiate between different types of objects and can provide information about the objects to the haptic engine 308, which can be programmed to provide haptic information that corresponds to the specific objects. For instance, a moving object (e.g., vehicle moving on road) may be identified with a longer pulse whereas a stationary object (e.g., parked/stopped vehicle) may be identified with a shorter pulse.

Calendar and/or other schedule information relevant to a user of the device 302 can additionally be used to provide haptic feedback. For example, the mobile computing device 320 can maintain a schedule for the user and information regarding the user running ahead of or behind schedule can be provided to the user as haptic feedback by the device 302. For example, if the user is running late to catch a train he/she is scheduled to take, the device 302 can provide haptic feedback to indicate that the user should speed up. Similarly, if the user is ahead of schedule to catch the train, the device 302 can provide haptic feedback to indicate that the user can slow down. The device 320 can be programmed to monitor for external changes affecting the user's schedule, such as the train running behind or ahead of schedule, and can convey such changes to the device 302, which can provide haptic feedback to the user through the array 304 regarding the changes.

The CPU 306 can take into account the relative reliability of various inputs when determining whether to provide information to the haptic engine 308. For example, the CPU 306 may receive inconsistent information about surrounding objects from the vehicle-to-vehicle interface 312 and the proximity sensors 322. In such instances, the CPU 306 may use the spatial information that is determined to be more reliable when determining information to provide to the haptic engine 308.

The CPU 308 can additionally detect nearby objects through monitoring for nearby wireless devices transmitting beacon signals over one or more wireless protocols, such as Wi-Fi and/or BLUETOOTH.

The haptic engine 308 can also maintain and update a user profile 326 that is used to determine particular types of haptic feedback that should be provided to the user of the device 302 in various instances. For example, the haptic engine 308 can monitor whether the user is appropriately receiving and responding to haptic action instructions provided over the array 304 by monitoring whether the user performed the instructed action (e.g., whether the user turned right after receiving a haptic instruction to turn right). If the user performed the instructed action, information regarding the haptic variables (e.g., intensity of pulse, duration of pulse, timing of providing the pulse relative to when the action should be performed) that were used to provide the instruction given the current context for the user (e.g., speed, type of location) can be stored in the user profile 326 and used to provide haptic instructions under similar circumstances in the future. In contrast, if the user did not respond as instructed, the user may not have appropriately received the instruction (e.g., instruction was too weak, instruction was provided too late). Such information can be recorded and used to adjust future haptic instructions that are provided to the user under similar circumstances.

The device 302, in combination with the user mobile device 320, can be used, for example, to coordinate group movements, such as to provide wayfinding instructions to users so that they can meet up with each other and/or navigate an environment in a coordinated manner.

The haptic engine 308 can additionally use the current power level for the power source 310 as a factor to determine whether, when, and what type of haptic instructions to provide using the array 304. For example, particular types of haptic information (e.g., spatial information) may not be provided when the power level (e.g., battery charge level) is less than a threshold amount.

The system 300 may, in some implementations, additionally include one or more wired interfaces 330 that can be connected to a computer system 332, such as a vehicle computer system that can provide information (e.g., nearby objects, sensor information) related to a vehicle in which the device 302 is installed. For example, the device 302 can, in some implementations, be installed in a seat that an operator of the vehicle will use, and the device 302 can be connected to a computer system 332 for the vehicle to receive information relevant to the vehicle's current surroundings, as described above with regard to FIG. 1C.

The computer system 332 can additionally and/or alternatively be connected to the device 302 through one or more wired interfaces, such as the BLUETOOTH radio interface 314, and/or through a connection with the mobile computing device 320. For instance, the computer system 332 can be a remote crowd control system that is programmed to provide guidance information to the device 302 and/or 320 that can be used to assist the user in navigating to an optimal location within the crowd. In another example, the computer system 332 can be a remotely controlled device/system that is providing position information back to the device 302 through a connection with the device 320 that is controlling its operation, and the position information can be conveyed to the user through the haptic array 304. Other implementations of the computer system 332 are also possible.

Figure 4:
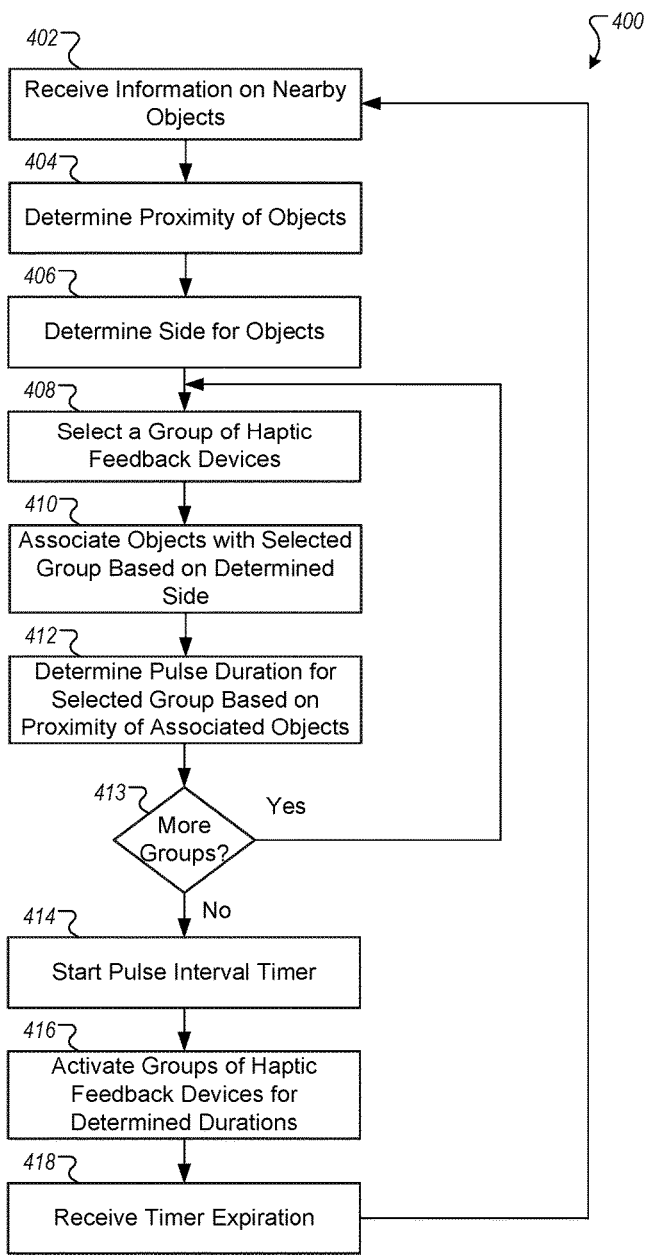
FIG. 4 is a flowchart of an example technique for providing haptic feedback to a user conveying the status of nearby objects.

FIG. 4 is a flowchart of an example technique 400 for providing haptic feedback to a user conveying the status of nearby objects. The example technique 400 can be performed, for example, by the systems and/or devices described above with regard to FIGS. 1A-C, 2, and/or 3.

Information on nearby objects can be received (402) and proximity to those objects can be determined (404). For example, device 302 can receive information on nearby vehicle through the V2V radio interface 312 and can use that information to determine the distance to those vehicles. A side on which the objects occur relative to the haptic device can also be determined (406). For example, the information can be used to determine whether vehicles are approaching on the left or ride side of the user.

A group of haptic feedback devices can be selected (408), objects can be associated with the selected group based on the side on which they are located (410), and a pulse duration for the selected group of haptic feedback devices can be determined based on the proximity of the objects associated with the group (412). For example, the right haptic array 102a can be selected, objects (e.g., vehicles) that are approaching the user 104 from the right can be associated with the right haptic array 102a, and a duration for activating the right haptic array 102a can be determined based on the distance from those objects on the right to the user 104 (e.g., longer duration for closer objects, shorter duration for further away objects). A determination can be made as to whether there are other groups of haptic feedback devices (413). If there are additional groups for which the pulse duration has not yet been determined, then the steps 408-413 can be repeated until a pulse duration has been determined for each of the groups.

Pulse durations can range from zero (no pulse) to the entire interval over which pulses are delivered. If all pulse durations have been determined, then a pulse interval timer can be started (414) and the groups of haptic feedback devices can be activated for their corresponding determined durations (416). For example, if there is a vehicle on the right that is close to the user 104 and a vehicle on the left that is further away from the user 104, the right array 102a and the left array 102b can be simultaneously activated, but the duration of the activation for the right array 102a can persist for longer than the activation for the left array 102b, which can indicate to the user 104 that there are vehicles on both sides, but that the vehicle on the right is closer than the vehicle on the left. By using consistent time intervals to deliver feedback that varies by location and duration, a user can receive information that is intelligible and that will avoid causing a panic. Upon expiration of the timer 418, the steps 402-418 can be repeated.

Figure 5:
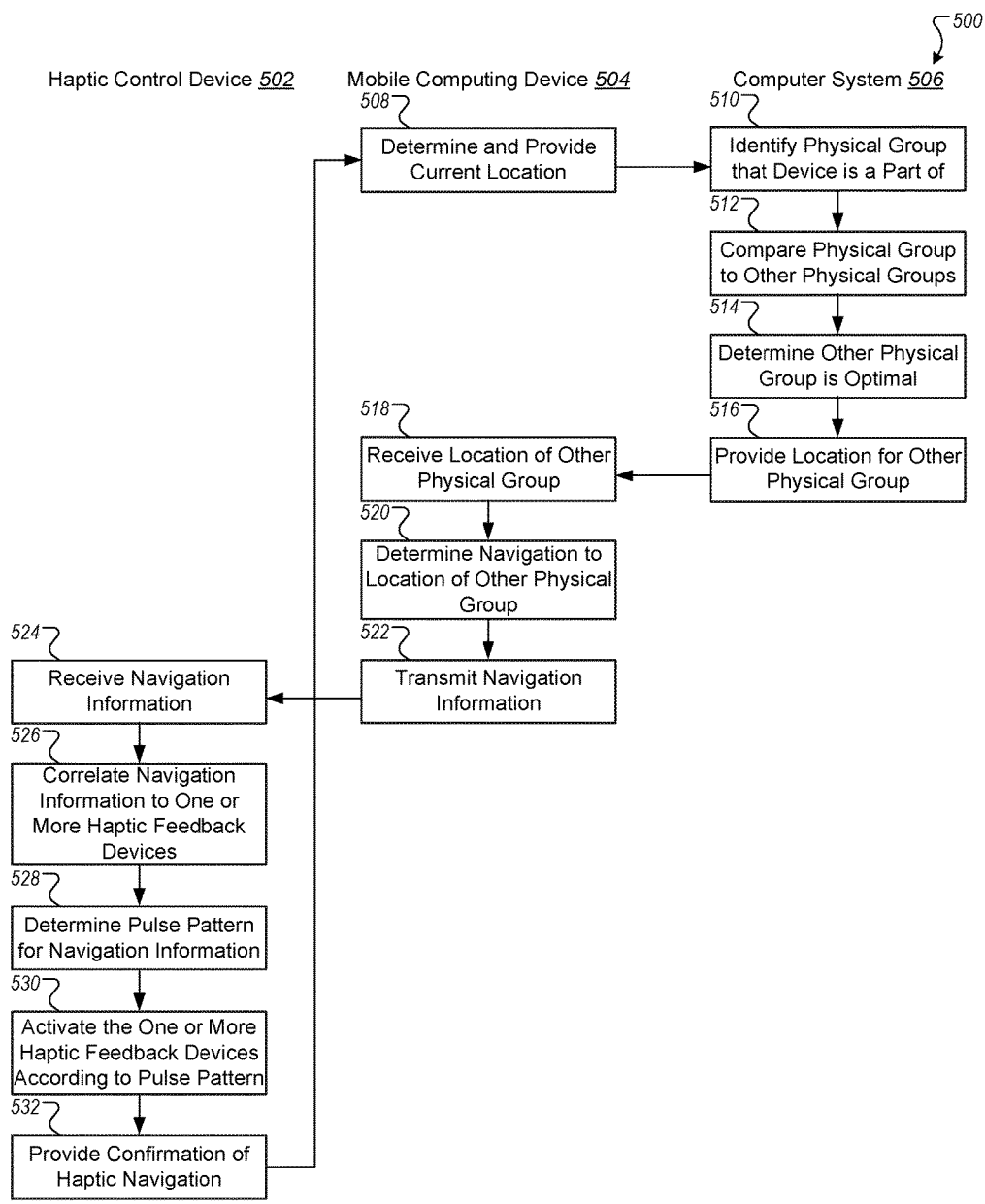
FIG. 5 is a flowchart of an example technique for providing haptic feedback to a user conveying suggested movements within a crowd.

FIG. 5 is a flowchart of an example technique 500 for providing haptic feedback to a user conveying suggested movements within a crowd. The example technique 500 can be performed, for example, by the systems and/or devices described above with regard to FIGS. 1A-C, 2, and/or 3. An example haptic control device 502, an example mobile computing device 504, and an example computer system 506 are depicted as performing portions of the technique 500.

A current location of the mobile computing device 504 can be determined and provided to the computer system 506 (508), which can use the location information to identify a physical group within a crowd that the device (and the user associated with the device) is a part of (510). For example, the computer system 506 can determine which line or entrance to an event that the mobile computing device 504 is located in. The computer system 506 can compare the physical group with other physical groups (512) and can determine whether another physical group would be optimal for the user (514). For example, the computer system 506 can compare the line information (e.g., length, expected wait duration) and can determine whether another line would be faster (optimal) for the user. In response to determining that another group would be optimal, the computer system 506 can provide location information for the other physical group (516), which can be received by the mobile computing device 504 (518) and used by the device 504 to determine navigation to the other physical group (520). For example, the mobile computing device 504 can receive location information for a faster line and can determine a route for navigating to the location of the faster line.

The mobile computing device 504 can transmit the navigation information (522), which can be received by the haptic control device 502 (524). The navigation information can be correlated to one or more haptic feedback devices (526), a pulse pattern can be determined (528), and the one or more haptic feedback devices can be activated according to the pulse pattern (530). For example, if the navigation information is for the user to move to a line that is to the right of the line where the user is currently location, the haptic control device 502 can select a haptic array on the right side of the user's body, can determine a pulse pattern that will be understandable to the user as instructions to move to the right, and can activate the array on the right according to the pattern. Confirmation can be provided once the haptic feedback has been provided to the user (532) and the steps 508-532 can be repeated.

Figure 6:
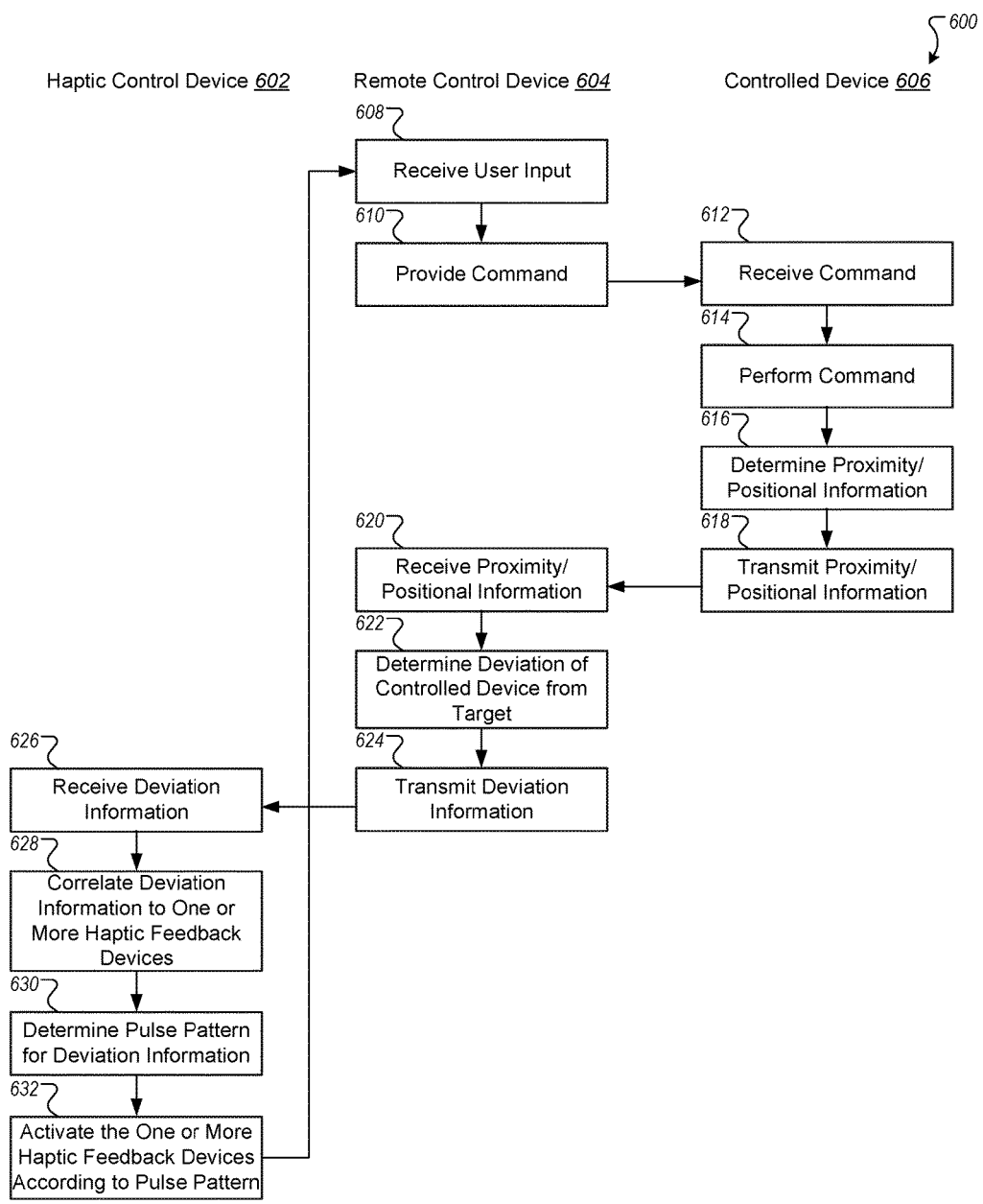
FIG. 6 is a flowchart of an example technique for providing haptic feedback to a user remotely controlling another device.

FIG. 6 is a flowchart of an example technique 600 for providing haptic feedback to a user remotely controlling another device. The example technique 600 can be performed, for example, by the systems and/or devices described above with regard to FIGS. 1A-C, 2, and/or 3. An example haptic control device 602, an example remote computing device 604, and an example controlled device 606 (being controlled by the device 604) are depicted as performing portions of the technique 600.

User input to control the device 606 can be received (608) and a command corresponding to the user input can be provided by the device 604 (610), which can be received by the controlled device 606 (612). For example, the user can provide input through an input mechanism (e.g., joystick, keypad, microphone) which can be translated into a command for the controlled device 606. The controlled device 606 can perform the command (614), can determine proximity/positional information for the device 606 and its component parts (616), and can transmit the proximity/positional information (618). For example, the device 606 can determine a position of one or more robotic arms of the device 606 and/or a position of the device 606 relative to one or more other objects and/or coordinate systems.

The proximity/positional information can be received by the control device 604 (620) and used by the device 604 to determine deviations in the controlled device 606 relative to one or more targets for the device 606 (622). For example, the control device 604 can receive the proximity/positional information and determine whether the controlled device 606 is in the expected (target) position/location after performing the command (614), or whether there is a deviation from this expected position/location. For instance, if the controlled device 606 is a robot that is attempting to place an object in an opening, the proximity/positional information can be used to determine who far and in what direction the object is currently located from the opening.

The control device 604 can transmit the deviation information (624), which can be received by the haptic control device 602 (626). The deviation information can be correlated to one or more haptic feedback devices (628), a pulse pattern can be determined (630), and the one or more haptic feedback devices can be activated according to the pulse pattern (632). For example, if the deviation information is that the controlled device 606 is located too far to the left and should be moved to the right, the haptic control device 602 can select a haptic array on the right side of the user's body, can determine a pulse pattern that will be understandable to the user as instructions to move to the right, and can activate the array on the right according to the pattern. Once the haptic feedback has been provided to the user, the steps 608-632 can be repeated, which can include the user iteratively providing input in response to the haptic feedback that is in turn responsive to the user's input.

Figure 7:
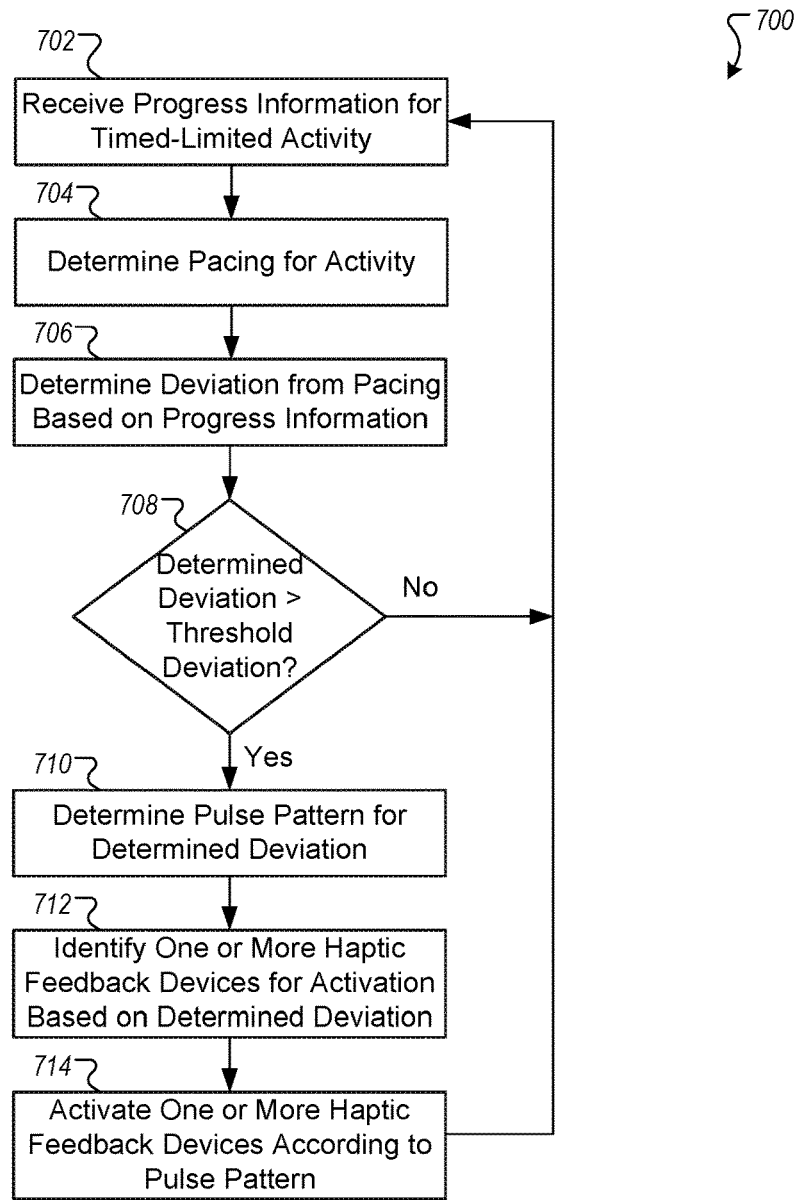
FIG. 7 is a flowchart of an example technique for providing haptic feedback to a user regarding progress during a time-limited activity.

FIG. 7 is a flowchart of an example technique 700 for providing haptic feedback to a user regarding progress during a time-limited activity. The example technique 700 can be performed, for example, by the systems and/or devices described above with regard to FIGS. 1A-C, 2, and/or 3.

Progress information for a time-limited activity can be received (702), pacing for the activity can be determined (704), and a deviation from the pacing can be determined from the progress information (706). For example, if the user is providing a presentation, progress information can be provided that indicates how far along the presentation that user has progressed and pacing for the user to finish the presentation within an allotted time can be determined (e.g., the user should be half-way through the slides in the presentation when half of the allotted time has elapsed). In another example, for a user travelling to a destination that has a strict time window for arrival (e.g., catching a bus/train/plane at a particular departure time), progress information can include the user's physical progress toward the destination and pacing can include an expected rate of progress along a path to the destination that the user should make to arrive on time. Based on the progress information and determined pacing, a deviation from the pacing can be determined (706) and a determination can be made as to whether that deviation exceeds a threshold deviation (708). For example, if the user has fallen off of a pace to finish a presentation on time or to arrive at a location on time, a determination can be made as to whether this fall-off in pace exceeds a threshold and warrants notifying the user to speed up. If the deviation does not exceed the threshold, then the notification will not be provided and the steps 702-708 can be repeated.

If the deviation does exceed the threshold, then a pulse pattern to convey the deviation can be determined (710), one or more haptic feedback devices for activation can be identified (712), and activated according to the determined pulse pattern (714). For example, if the user needs to speed up to finish his/her presentation on time or to arrive at a destination on time, a fast pulse pattern (or pulse pattern increasing in frequency) can be determined and can be provided across one or more haptic arrays that are being worn by the user. In another example, if the user can slow down, a slower pulse pattern (or pulse pattern decreasing in frequency) can be determined and provided across one or more haptic arrays worn by the user. The steps 702-714 can be repeated until the end of the time period.

Figure 8:
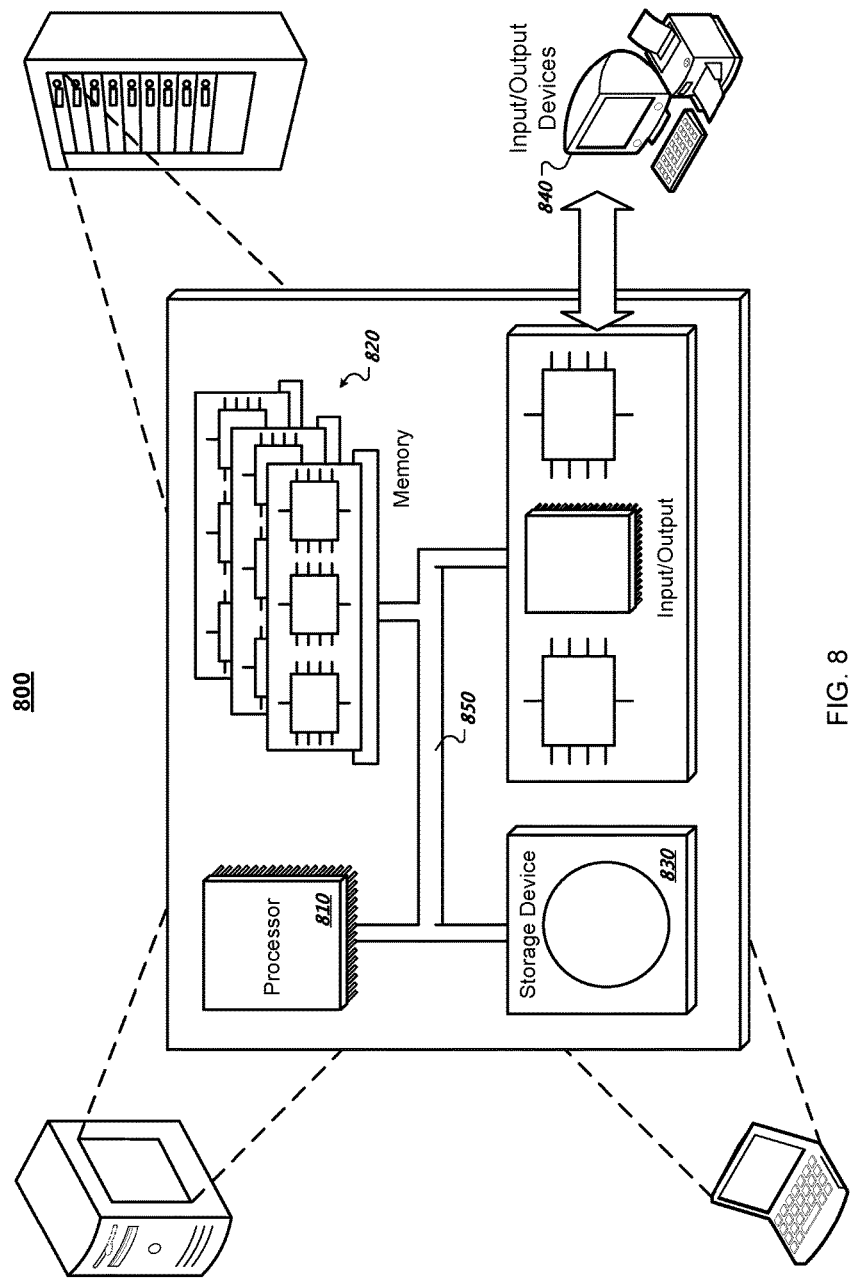
FIG. 8 illustrates a schematic diagram of an exemplary generic computer system.

FIG. 8 illustrates a schematic diagram of an exemplary generic computer system. The system 800 can be used for the operations described in association with the processes described throughout according to some implementations. Components of the system 800 may be included in the system 300 to implement the automated computer functionality provided by the system 300.

The system 800 includes a processor 810, a memory 820, a storage device 830, and an input/output device 840. Each of the components 810, 820, 830, and 820 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a subcombination or variation of a subcombination.

The invention claimed is:

1. A wearable device for providing non-visual guidance to users, the wearable device comprising:
   one or more wireless interfaces that receive information relating to a current environment of the wearable device, the one or more wireless interfaces comprising a vehicle-to-vehicle communications interface that is programmed to obtain position information for vehicles located nearby the wearable device;
   a haptic feedback array comprising a plurality of haptic motors arranged across at least a portion of the wearable device so that each of the plurality of haptic motors, when activated, presents haptic feedback from a distinct location of the wearable device;
   a haptic engine that is programmed to control the haptic feedback array; and
   one or more processors that are programmed to:
      determine non-visual guidance to output to a user of the wearable device based at least in part on the information that is received from the one or more wireless interfaces describing the current environment, the non-visual guidance comprising alerts indicating that at least one or more of the vehicles are approaching the user wearing the wearable device, wherein determining the non-visual guidance includes identifying non-visual navigational guidance and non-visual proximity alert guidance based on the information and applying rules that prioritize, for output to the user, the non-visual navigational guidance above the non-visual proximity alert guidance;

determine at least one pulse pattern to be presented through the haptic feedback array to provide the prioritized non-visual navigational guidance to the user; and instruct the haptic engine to cause the haptic feedback array to present the at least one pulse pattern and to present, prior to the at least one pulse pattern, at least one notifying pulse to indicate that the prioritized non-visual navigation guidance is upcoming.

2. The wearable device of claim 1, wherein the position information identifies (i) current locations of the vehicles and (ii) directional movement of the vehicles.

3. The wearable device of claim 1, wherein:
the haptic feedback array includes a first portion positioned along a right side of the user's body and a second portion positioned along a left side of the user's body,
the one or more processors are further programmed to (i) determine, based on the position information, sides from which the vehicles are approaching the user and distances to the vehicles, and (ii) determine a first pulse pattern for vehicles approaching from the right side of the user's body and a second pulse pattern for vehicles approaching from the left side of the user's body, and
the haptic engine is further programmed to control the first portion of the haptic feedback array according to the first pulse pattern and to control the second portion of the haptic feedback array according to the second pulse pattern.

4. The wearable device of claim 3, wherein:
the first pulse pattern comprises a first pulse duration that is determined based on first distances to the vehicles approaching from the right side of the user's body, and
the second pulse pattern comprises a second pulse duration that is determined based on second distances to the vehicles approaching from the left side of the user's body.

5. The wearable device of claim 4, wherein:
the first pulse duration is different from the second pulse duration,
the haptic engine is further programmed to:
simultaneously initiate activation of the first portion of the haptic feedback array and activation of the second portion of the haptic feedback array, and
maintain activation of the first portion of the haptic feedback array for the first pulse duration and activation of the second portion of the haptic feedback array for the second pulse duration.

6. The wearable device of claim 5, wherein the haptic engine is further programmed to simultaneously initiate activation of the first portion and the second portion of the haptic feedback array at repeated intervals, with the first pulse duration and the second pulse duration being determined for each interval.

7. The wearable device of claim 1, wherein the haptic engine is programmed to determine levels of pulse intensity to use to provide at least a portion of the non-visual guidance using the haptic feedback array.

8. The wearable device of claim 1, wherein the haptic engine is programmed to determine durations of pulses to use to provide at least a portion of the non-visual guidance using the haptic feedback array.

9. The wearable device of claim 1, wherein the haptic engine is programmed to determine intervals between pulses to use to provide at least a portion of the non-visual guidance using the haptic feedback array.

10. The wearable device of claim 1, wherein:
the information identifies (i) the user's progress toward a goal during a time-limited activity, (ii) a length of the time-limited activity, and (iii) a deadline to complete the time-limited activity,
the one or more processors are further programmed to determine whether to provide non-visual guidance based on whether the user's progress is within a threshold deviation from a target level of progress based on the length of and the deadline for the time-limited activity, and
the particular non-visual guidance comprises guidance to speed up or slow down performance the time-limited activity based on the progress being outside of the threshold deviation from the target level of progress.

11. The wearable device of claim 10, wherein the time-limited activity comprises a presentation and the progress comprises the user's progress through the presentation.

12. The wearable device of claim 10, wherein the time-limited activity comprises travelling to a destination location and the progress comprises the user's current location relative to the user's starting location.

13. The wearable device of claim 1, wherein:
the information identifies a location within a crowd of people to which a crowd management computer system determines to be an optimal location for the user within the crowd,
the crowd management computer system determining the optimal location based, at least in part, on a current location of the wearable device within the crowd and information on the locations of other people within the crowd,
the one or more processors are further programmed to determine to provide the non-visual guidance based on the location identified by the information being different from the current location, and
the particular non-visual guidance comprises guidance to move to the location.

14. The wearable device of claim 13, wherein the current location comprises a line or entrance at a venue and the location comprises a different line or entrance at the venue.

15. The wearable device of claim 1, wherein:
the information identifies current position of at least a portion of a remotely controlled device,
the one or more processors are further programmed to determine whether to provide the non-visual guidance based on the current position being different at least a threshold amount from a target position for the at least a portion of the remotely controlled device, and
the particular non-visual guidance comprises guidance to move the remotely controlled device in a direction to arrive at the target position through a remote control device operated by the user.

16. The wearable device of claim 15, wherein the information is iteratively received and output through the haptic feedback array as the user is providing commands through the remote control device to control the remotely controlled device.

17. The wearable device of claim 1, further comprising:
a lanyard to which at least a portion of the haptic feedback array affixed.

18. The wearable device of claim 1, wherein an intensity of the at least one pulse pattern presented through the haptic feedback array is based at least in part on a current speed at which the wearable device is travelling.

19. The wearable device of claim 1, further comprising: clothing to which at least a portion of the haptic feedback array woven or otherwise affixed.

* * * * *